United States Patent [19]

Drori

[11] Patent Number: 4,707,258
[45] Date of Patent: Nov. 17, 1987

[54] DISK FILTER

[76] Inventor: Mordeki Drori, 89 Zahal Street, Kiron, Israel

[21] Appl. No.: 872,490

[22] Filed: Jun. 10, 1986

[30] Foreign Application Priority Data

Jun. 10, 1985 [IL] Israel .................................. 75473

[51] Int. Cl.⁴ .................. B01D 27/12; B01D 29/38
[52] U.S. Cl. .................................. 210/333.1; 210/427
[58] Field of Search ............... 210/333.01, 333.1, 411, 210/425-427, 541, 542

[56] References Cited

U.S. PATENT DOCUMENTS

| | | | |
|---|---|---|---|
| 1,643,299 | 9/1927 | Furness | 210/488 |
| 1,719,346 | 7/1929 | Thompson | 210/357 |
| 1,797,399 | 3/1931 | Boulade | 210/488 |
| 1,804,512 | 5/1931 | Pickard | 210/492 |
| 1,852,873 | 4/1932 | Berger . | |
| 2,330,945 | 10/1943 | Becker | 210/444 |
| 2,365,525 | 12/1944 | Cox | 210/492 |
| 2,374,756 | 5/1945 | Kisch et al. | 210/232 |
| 2,455,486 | 12/1948 | Hicks | 210/492 |
| 2,495,095 | 1/1950 | Ewbank | 210/492 |
| 2,519,506 | 8/1950 | Russell | 210/492 |
| 2,554,016 | 5/1951 | Czarnecki | 210/492 |
| 2,575,995 | 11/1951 | Briggs | 210/492 |
| 2,631,732 | 3/1953 | Vocelka | 210/492 |
| 2,654,440 | 10/1953 | Robinson | 210/492 |
| 2,670,851 | 3/1954 | Curtis | 210/488 |
| 2,702,637 | 2/1955 | Shepard | 210/492 |
| 2,757,802 | 8/1956 | Schmid | 210/237 |
| 2,847,126 | 8/1958 | Goodman . | |
| 2,978,108 | 4/1961 | Strassheim | 210/488 |
| 3,005,556 | 10/1961 | Jensen | 210/488 |
| 3,105,042 | 9/1963 | Roosa | 210/444 |
| 3,111,963 | 11/1963 | Brockwell | 210/492 |
| 3,195,730 | 7/1965 | Muller | 210/488 |
| 3,473,668 | 10/1969 | Bunyard | 210/492 |
| 3,529,726 | 9/1970 | Keenan | 210/232 |
| 3,561,602 | 2/1971 | Molitor | 210/488 |
| 3,622,003 | 11/1971 | Czech | 210/411 |
| 3,647,084 | 3/1972 | Martin | 210/492 |
| 3,648,843 | 3/1972 | Pearson | 210/488 |
| 3,666,107 | 5/1972 | Boggs | 210/488 |
| 3,789,990 | 2/1974 | Drori . | |
| 4,026,806 | 5/1977 | Drori . | |
| 4,042,504 | 8/1977 | Drori . | |
| 4,045,345 | 8/1977 | Drori . | |
| 4,062,774 | 12/1977 | Hinojosa | 210/444 |
| 4,067,812 | 1/1978 | Drori . | |
| 4,115,274 | 9/1978 | Boddeker | 210/488 |
| 4,156,651 | 5/1979 | Mehoudar | 210/488 |
| 4,207,181 | 6/1980 | Drori . | |
| 4,251,374 | 2/1981 | Cunningham | 210/232 |
| 4,267,042 | 5/1981 | Hofmann | 210/444 |
| 4,267,045 | 5/1981 | Hoof | 210/488 |
| 4,271,018 | 6/1981 | Drori . | |
| 4,278,540 | 7/1981 | Drori . | |
| 4,295,963 | 10/1981 | Drori . | |
| 4,312,374 | 1/1982 | Drori . | |
| 4,402,829 | 9/1983 | Cordua | 210/488 |
| 4,410,430 | 10/1983 | Hagler | 210/488 |
| 4,430,232 | 2/1984 | Boucet | 210/798 |
| 4,435,287 | 3/1984 | Sumimoto | 210/232 |
| 4,481,111 | 11/1984 | Christophe | 210/345 |
| 4,552,655 | 11/1985 | Granot | 210/488 |
| 4,552,662 | 11/1985 | Webster | 210/444 |
| 4,592,838 | 6/1986 | Christophe et al. | 210/333.01 |

Primary Examiner—Frank Sever
Attorney, Agent, or Firm—Cushman, Darby & Cushman

[57] ABSTRACT

A filter comprising a housing including an inlet coupled to a fluid inlet and an outlet coupled to a fluid outlet, and a filter assembly disposed inside the housing and arranged to intercept the flow of fluid from the fluid inlet to the fluid outlet, the filter assembly comprising a stack of filter screen elements, each filter screen element comprising a generally annular screen and spacer means associated with the screen and defining at least one inlet chamber adjacent each annular screen at an upstream side thereof for collection of contaminants and at least one outlet passage adjacent each annular screen at a downstream side thereof for permitting drainage of filtered fluid, the filter assembly defining a multiplicity of inlet contaminant collection chambers adjacent a multiplicity of annular screens.

15 Claims, 11 Drawing Figures

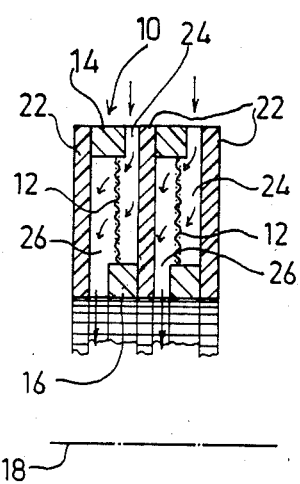
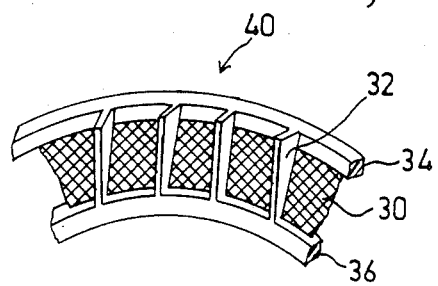
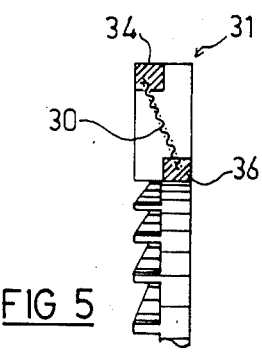
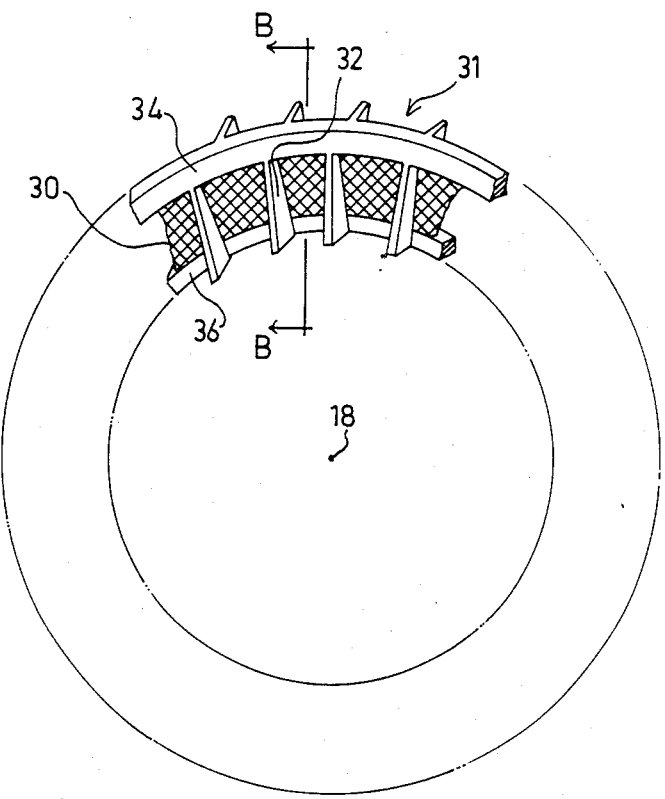
FIG 3
FIG 6
FIG 5
FIG 4

DISK FILTER

FIELD OF THE INVENTION

The present invention relates to filters generally and more particularly to filters which are cleanable by backwashing.

BACKGROUND OF THE INVENTION

There are known various types of filters for use in agricultural, domestic and industrial applications. One particularly successful type of filter is the disc filter, which is exemplified in the following patents and patent applications of the present applicant: U.S. Pat. Nos. 4,026,806; 4,045,345; 4,067,812; 4,207,181; U.S. patent application Nos. 623,353; 647,093; 647,094; Israel Patent Application No. 71674, and European Patent Application No. 85630236.9.

Another type of filter, known as the screen filter, is also known and comprises a cylindrical screen through which a liquid passes during filtration. The screen filter is characterized by the ability to provide extremely fine filtration, down to 50 microns or less.

SUMMARY OF THE INVENTION

The present invention seeks to provide a new type of filter which has particular advantages for automatic cleaning filter systems and has the precise fine filtration characteristics of the screen filter.

There is thus provided in accordance with a preferred embodiment of the present invention, a filter comprising a housing including an inlet coupled to a fluid inlet and an outlet coupled to a fluid outlet, and a filter assembly disposed inside the housing and arranged to intercept the flow of fluid from the fluid inlet to the fluid outlet, the filter assembly comprising a stack of filter screen elements, each filter screen element comprising a generally annular screen and spacer means associated with the screen and defining at least one inlet chamber adjacent each annular screen at an upstream side thereof for collection of contaminants and at least one outlet passage adjacent each annular screen at a downstream side thereof for permitting drainage of filtered fluid, the filter assembly defining a multiplicity of inlet contaminant collection chambers adjacent a multiplicity of annular screens.

In accordance with a preferred embodiment of the invention, the filter screen elements comprise filter screen discs.

Additionally in accordance with a preferred embodiment of the invention, the annular screens are arranged in generally parallel arrangement.

Further in accordance with a preferred embodiment of the invention, the overall surface area of annular screens exceeds the overall area of the cylindrical surface of the filter assembly by a factor of at least 2.

Additionally in accordance with an embodiment of the present invention, the spacer means comprises first and second inner and outer rings, onto which the annular screen is mounted, and which serve to define and seal the inlet chambers from the outlet passages.

Also in accordance with a preferred embodiment of the present invention, there are provided separation means for dividing the volume adjacent each annular screen into a plurality of generally coplanar volumes.

Additionally in accordance with an embodiment of the invention each inlet chamber is formed with at least one wall which is defined by a screen.

Further in accordance with one embodiment of the invention the annular screens are arranged to lie in planes perpendicular to the longitudinal axis of the filter assembly.

According to an alternative embodiment of the invention, the annular screens are arranged to lie at a slant with respect to the plane which is perpendicular to the longitudinal axis of the filter assembly.

In this embodiment, the annular screens may be arranged to all lie at the same slant. Alternatively they may be arranged to lie at alternating opposite slants, whereby the inlet chambers lie between two oppositely slanted screens.

Additionally in accordance with an embodiment of the invention, there are provided spacer discs intermediate each pair of filter screen discs. Alternatively, no such spacer discs are provided.

Also in accordance with an embodiment of the invention, the filter screen elements may be separated along the longitudinal axis of the filter assembly for simplified cleaning by flushing.

Further in accordance with an embodiment of the present invention, the filter is also provided with means for cleaning of the filter assembly including a backwash means disposed in operative engagement in fluid communication with the inlet chambers for removing contaminants collected therein.

Additionally in accordance with the above embodiment of the present invention, there is also provided means for providing relative movement between the backwash means and the filter assembly during a backwash operation so as to cause the backwash means systematically to communicate with the various inlet chambers defined thereon for removing the contaminants connected therein.

BRIEF DESCRIPTION OF THE DRAWINGS

The present invention will be understood and appreciated more fully from the following detailed description taken in conjunction with the drawings in which:

FIG. 3 is a sectional illustration taken along the lines A—A of FIG. 1;

FIG. 4 is a pictorial illustration of a portion of a filter screen disc constructed and operative in accordance with another preferred embodiment of the present invention;

FIG. 5 is a sectional illustration taken along the lines B—B of FIG. 4;

FIG. 6 is a pictorial illustration of a portion of a filter screen disc constructed and operative in accordance with yet another preferred embodiment of the present invention;

DETAILED DESCRIPTION OF THE INVENTION

Figure 1:
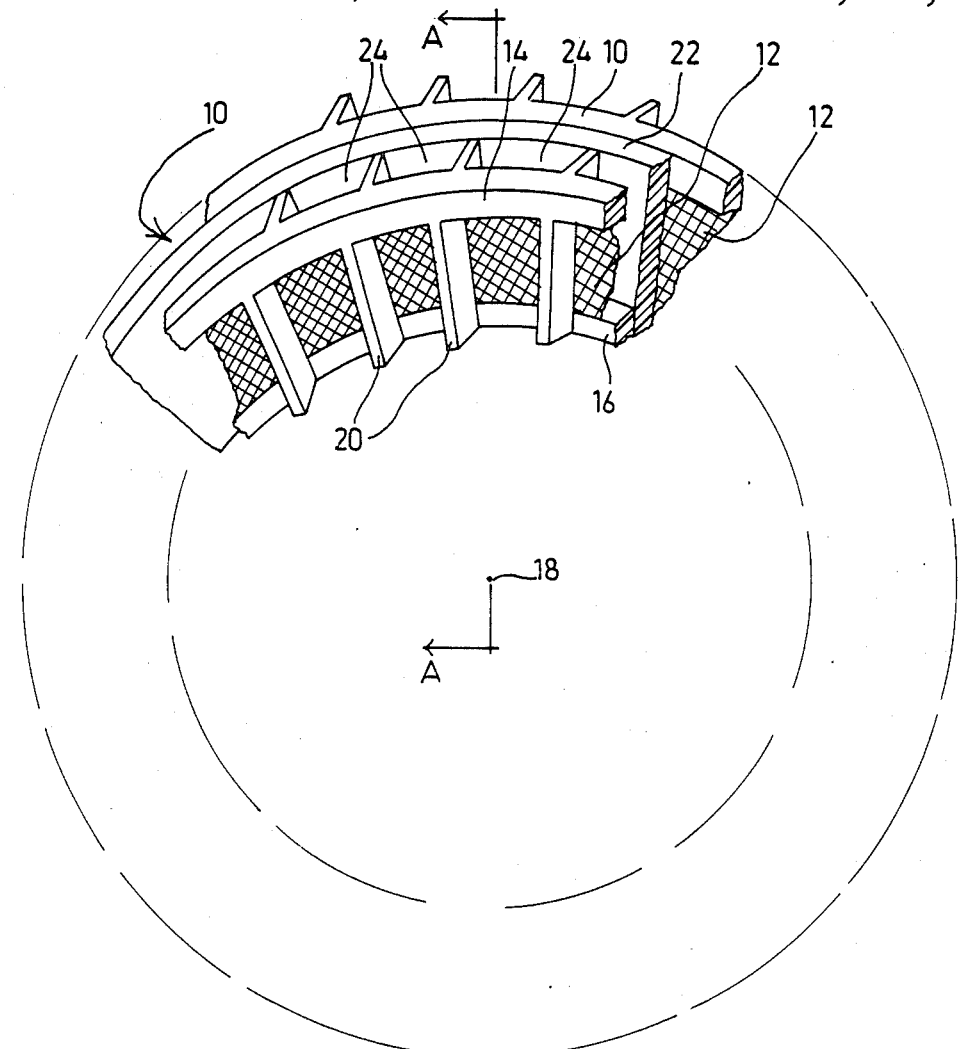
FIGS. 1 and 2 are pictorial illustrations of a portion of a filter assembly constructed and operative in accordance with a preferred embodiment of the present invention taken from respective opposite directions.
Figure 2:
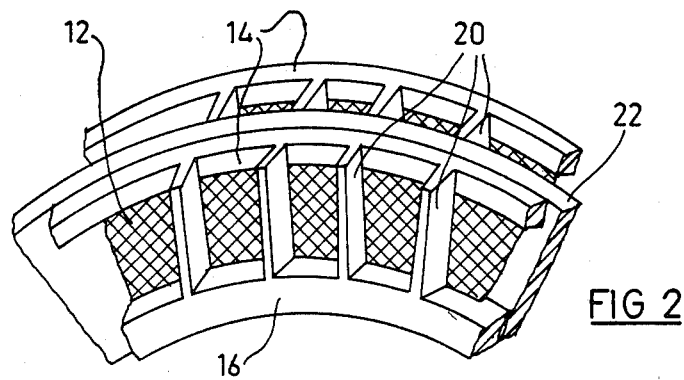

Reference is now made to FIGS. 1-3, which illustrate filter screen discs constructed and operative in accordance with a preferred embodiment of the invention. Discs are a preferred form of the filter screen element, it being appreciated that forms of the element other than discs may also be employed.

As seen in FIGS. 1-3, the filter screen discs, indicated generally by reference numeral 10, typically are formed in the shape of a circular ring having a hollow center. The rings comprise an annular screen 12 which is supported on first and second sealing and support rings 14 and 16 which are disposed on respective opposite sides of the annular screen 12 with respect to the longitudinal axis of a stack of such rings, indicated by reference numeral 18. Rings 14 and 16 are disposed at radially opposite peripheries of the screen, ring 14 being located at the outer periphery of the screen, and ring 16 being located at the inner periphery of the screen.

Radially extending spacer baffles 20 join the two rings 14 and 16 and provide additional support for the screen. These baffles may be provided along one or both sides of the screen and may divide the volumes adjacent each screen into separate chambers.

A spacer disc 22 may be disposed intermediate each pair of filter screen discs, as shown in FIGS. 1-3. Alternatively it may be eliminated.

FIG. 3 illustrates the flow of fluid, typically a liquid to be filtered, in the embodiment of FIGS. 1 and 2. The liquid enters the stack of filter screen discs from its outer surface through the volume whose inlet is defined between rings 14 and the adjacent spacer disc 22 and which is subdivided by baffles 20 into a multiplicity of inlet chambers 24.

The liquid is filtered as it passes through screen 12, defining a side wall of each such inlet chamber 24, causing the filtered out contaminants to collect in the inlet chamber 24. The filtered water passes through the screen 12 and is drained to the center of the stack of discs via an outlet chamber 25, whose outlet is defined between rings 16 and respective adjacent spacer disc 22.

Alternatively the flow of fluid may be opposite to that described hereinabove. In such case, the outlet chambers become inlet chambers and vice versa. It is appreciated that alternating flow patterns through the filter may be provided by suitable conventional valving (not shown).

In the illustrated embodiment, it is noted that the screen 12 is disposed in a plane perpendicular to the longitudinal axis 18 of the stack and that the various annular screens of the filter screen discs are arranged in a mutually parallel arrangement.

It is a particular feature of the present invention that a relatively very high ratio of screen area is provided for a given overall filter volume, thus enhancing the filter capacity for its size, both in terms of filter surface area and in terms of accumulation capacity. The provision of inlet chambers 24 adjacent each screen area enables large volumes of contaminants to be collected before cleaning is required.

Reference is now made to FIGS. 4 and 5 which illustrate an alternative embodiment of the invention wherein the screen 30 of the filter disc 31 is disposed at a slant with respect to the plane perpendicular to axis 18. This embodiment has a number of advantages including the increased surface area of screen 30 which is provided due to its slanted orientation as well as the possibility of eliminating the spacer disc as will be described hereinbelow.

Here it is seen that generally triangular baffles 32 are provided for joining respective outer and inner screen support rings 34 and 36.

FIG. 6 illustrates a filter screen disc 40 which is similar to that of FIG. 4 but wherein the baffles 32 are arranged in an opposite sense from those in the embodiment of FIG. 4, such that ring 34 is to the right of ring 36, instead of to the left thereof as shown in FIGS. 4 and 5.

Figure 7B:
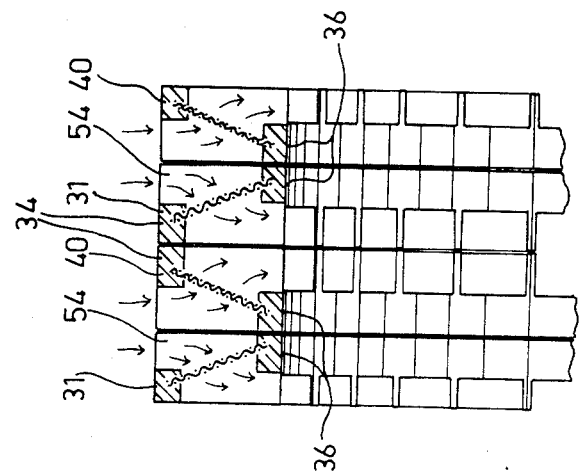
FIGS. 7A and 7B are two sectional illustrations of stacks of filter screen discs, with and without spacer discs, respectively.
Figure 7A:
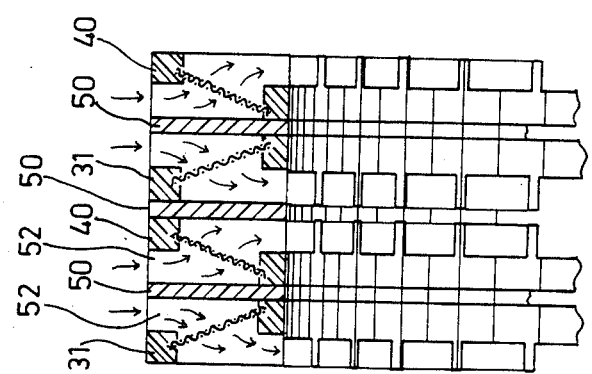

Reference is now made to FIGS. 7A and 7B which illustrate stacks of filter screen discs of the type shown in FIGS. 4-6. FIG. 7A shows a stack of alternating filter discs 31 and 40 separated by spacer discs 50. It is seen that two separate and opposite inlet chambers 52 are defined on opposite sides of the spacer discs.

FIG. 7B illustrates an embodiment wherein the spacer discs 50 are eliminated. Here, the rings 36 lie in juxtaposed sealing engagement as are the rings 34. Here also, the inlet chambers 54 are of double volume and have screens defined along both walls thereof.

Figure 8:
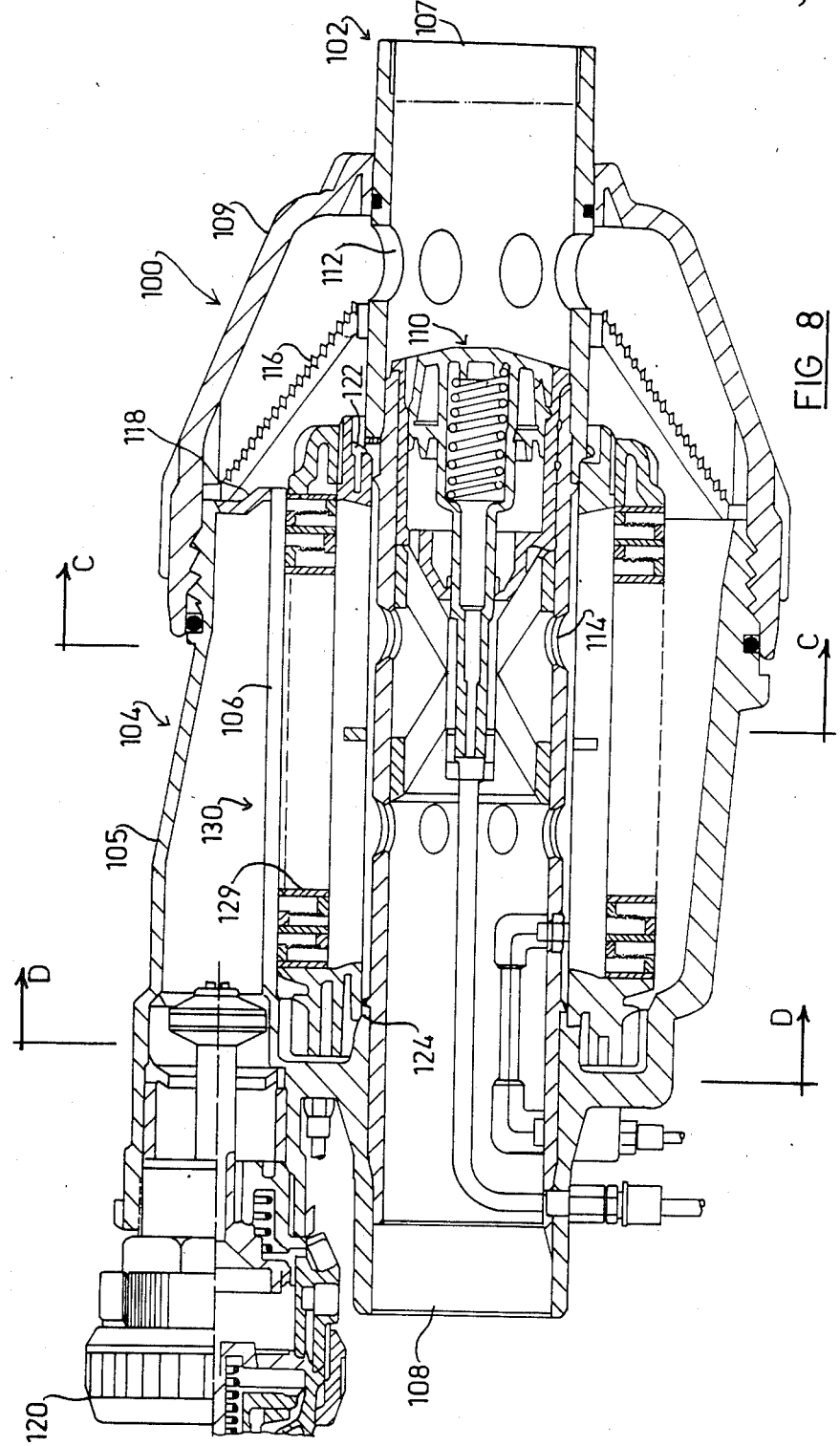
FIG. 8 is a pictorial illustration of an automatically cleanable filter incorporating the filter screen assembly of the present invention.
Figure 10:
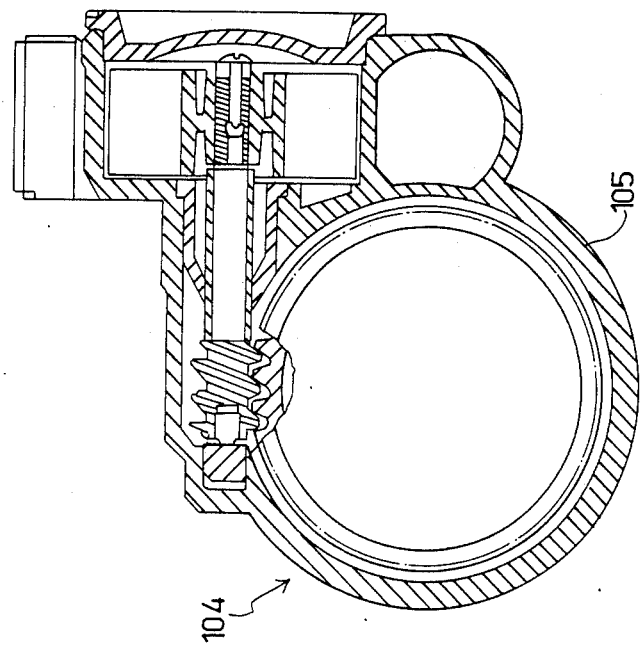
FIGS. 9 and 10 are sectional illustrations of the apparatus of FIG. 8 taken along lines C—C and D—D respectively.
Figure 9:
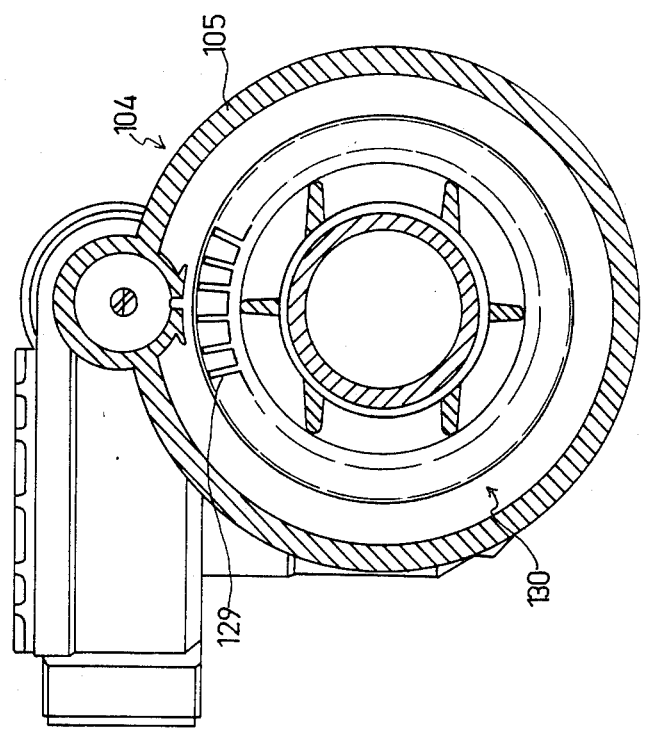

Reference is now made to FIG. 8, which illustrates an automatically cleanable backwash filter in which the filter screen discs described above find particular application. It is to be appreciated that the filter screen discs described above are not limited in their application to automatically cleanable filters and are beneficial in non-automatic type filters as well. They find particular application in automatically cleanable filters because they present relatively large contaminant containing inlet chambers which are readily cleaned by automatic cleaning apparatus.

One embodiment of an automatically cleanable filter is shown in FIG. 8. The embodiment shown in FIG. 8 includes a filter housing 100 comprising an inner tubular section 102 and an outer, generally cylindrical section 104 for enclosing a filter body 106 therebetween. An end 107 of the tubular section 102 defines the housing inlet and is connectable to an upstream pipe, and the opposite end 108 defines the outlet and is connectable to the downstream pipe. Tubular section 102 also includes a deflector 110 plugging the inlet side of tubular section 102 thereby constraining the flow of the water through a plurality of inlet openings 112 formed on one side of the deflector, through the filter body 106 in the radially-inward direction, and out through outlet openings 114 formed on the other side of the deflector. The housing further includes a conical coarse filter 116 for removing the large particles before reaching the main filter body 106. The main filter body 106 is automatically cleaned, whenever necessary, by a backwashed nozzle 118 disposed adjacent to the upstream (outer) surface of the filter body, one cleaning being effected during a backwash operation under the control of a control device 120.

Backwash nozzle 118 is fixed to the main section 105 of the outer housing 104, the latter section threadably receiving an end collar 109, with the coarse filter 116 being clamped between these two sections. The control device 120 is carried at the end of housing section 105 opposite to that closed by collar 109. Since the filter illustrated in FIG. 8 is connected in-line, the main physical forces to which the filter is subjected when connected in a line are applied to the inner tubular section 102, rather than to the outer housing section 104; therefore the outer housing section 104 may be made of plastic material, but the inner tubular section 102 should be made of strong rigid material, such as metal capable of withstanding high physical forces.

The rotary filter body 106 comprises a stack of annular screen filter discs 129 of any of the types illustrated hereinabove in FIGS. 1–7. Screen filter discs 129 are supported on an open cylindrical cage 130 rotatably received on rotary-bearing seals 122 and 124.

A full description of the structure and operation of the automatically cleanable filter of the type shown in FIG. 8 is provided in applicant's pending U.S. patent application No. 599,261, filed Apr. 11, 1984, the disclosure of which is incorporated herein by reference.

It will be appreciated by persons skilled in the art that the present invention is not limited to what has been particularly shown and described hereinabove. Rather the scope of the present invention is defined only by the claims which follow:

I claim:

1. A filter comprising structure for automatic and non-automatic filter systems designed to enable extremely fine filtering down to about 50 microns or less while providing enhanced filtering capacity, said structure including:
   a housing including an inlet coupled to a fluid inlet and an outlet coupled to a fluid outlet; and
   a filter assembly disposed inside the housing and arranged to intercept the flow of fluid from the fluid inlet to the fluid outlet, said filter assembly comprising a stack of filter screen elements.
   each filter screen element comprising a generally annular screen and spacer means associated with the screen and defining at least one inlet chamber adjacent each annular screen at an upstream side thereof for collection of contaminants and at least one outlet passage adjacent each annular screen at a downstream side thereof for permitting drainage of filtered fluid,
   said filter assembly defining a multiplicity of inlet contaminant collection chambers adjacent a multiplicity of annular screens,
   wherein said annular screens are arranged to lie at a slant with respect to the plane which is perpendicular to the longitudinal axis of the filter assembly, said slant arrangement presenting an increased surface area of said annular screens to said inlet fluid for enhancing the filter capacity.

2. Apparatus according to claim 1 and wherein said filter screen elements comprise filter screen discs.

3. Apparatus according to claim 1 and wherein said annular screens are arranged in generally parallel arrangement.

4. Apparatus according to claim 1 and wherein the overall surface area of the annular screens exceeds the overall area of the cylindrical surface of the filter assembly by a factor of at least 2.

5. Apparatus according to claim 1 and wherein the overall surface area of the annular screens exceeds the overall area of the cylindrical surface of the filter assembly by a factor of at least approximately 10.

6. Apparatus according to claim 1 and wherein said spacer means comprises first and second, inner and outer rings onto which the annular screen is mounted and which serve to define and seal the inlet chambers from the outlet passages.

7. Apparatus according to claim 1 and also comprising separation means for dividing the volume adjacent each annular screen into a plurality of generally coplanar volumes.

8. Apparatus according to claim 1 and wherein each inlet chamber is formed with at least one wall which is defined by a screen.

9. Apparatus according to claim 1 and wherein said annular screens are arranged to all lie at the same slant.

10. Apparatus according to claim 1 and wherein said annular screens are arranged to all lie in alternating opposite slants, whereby the inlet chambers lie between two oppositely slanted screens.

11. Apparatus according to claim 1 and also comprising spacer discs intermediate each pair of filter screen discs.

12. Apparatus according to claim 1 and also comprising means for mounting the filter screen elements in a manner such that they may be separated along the longitudinal axis of the filter assembly for simplified cleaning by flushing.

13. Apparatus according to claim 1 and also comprising means for cleaning of the filter assembly including a backwash means disposed in operative engagement in fluid communication with the inlet chambers for removing contaminants collected therein.

14. Apparatus according to claim 13 and also comprising means for providing relative movement between the backwash means and the filter assembly during a backwash operation so as to cause the backwash means systematically to communicate with the various inlet chambers defined thereon for removing the contaminants connected therein.

15. A filter assembly arranged to intercept a flow of fluid and comprising structure for automatic and non-automatic filter systems designed to enable extremely fine filtering down to about 50 microns or less while providing enhanced filtering capacity, said structure including a stack of filter screen elements, each filter screen element comprising a generally annular screen and spacer means associated with the screen and defining at least one inlet chamber adjacent each annular screen at an upstream side thereof for collection of contaminants and at least one outlet passage adjacent each annular screen at a downstream side thereof for permitting drainage of filtered fluid,
   said filter assembly defining a multiplicity of inlet contaminant collection chambers adjacent a multiplicity of annular screens,
   wherein said annular screens are arranged to lie at a slant with respect to the plane which is perpendicular to the longitudinal axis of the filter assembly, said slant arrangement presenting an increased surface area of said annular screens to said inlet fluid for enhancing the filter capacity.

* * * * *